(12) United States Patent
Verschueren et al.

(10) Patent No.: US 8,610,661 B2
(45) Date of Patent: Dec. 17, 2013

(54) ELECTROPHORETIC DEVICE AND METHOD FOR CONTROLLING THE SAME

(75) Inventors: Alwin Rogier Martijn Verschueren, Eindhoven (NL); Mark Thomas Johnson, Eindhoven (NL); Martinus Hermanus Wilhelmus Maria Van Delden, Eindhoven (NL); Sander Jurgen Roosendaal, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1135 days.

(21) Appl. No.: 12/307,792

(22) PCT Filed: Jul. 3, 2007

(86) PCT No.: PCT/IB2007/052592
§ 371 (c)(1),
(2), (4) Date: Jan. 7, 2009

(87) PCT Pub. No.: WO2008/007302
PCT Pub. Date: Jan. 17, 2008

(65) Prior Publication Data
US 2009/0295765 A1   Dec. 3, 2009

(30) Foreign Application Priority Data

Jul. 11, 2006  (EP) .................................... 06117000
Nov. 30, 2006  (EP) .................................... 06125058

(51) Int. Cl.
*G09G 3/34*   (2006.01)

(52) U.S. Cl.
USPC ............................................ 345/107; 359/296

(58) Field of Classification Search
USPC ........ 345/107, 30, 55, 84; 313/16, 29–41, 50, 313/163–173, 232, 328; 356/344; 359/253, 359/272, 296
See application file for complete search history.

(56) References Cited

U.S. PATENT DOCUMENTS

| | | | |
|---|---|---|---|
| 7,142,268 B1 * | 11/2006 | Lowe .............................. | 349/86 |
| 7,733,323 B2 * | 6/2010 | Togano et al. ................ | 345/107 |
| 2003/0214479 A1 * | 11/2003 | Matsuda et al. .............. | 345/107 |
| 2003/0231162 A1 * | 12/2003 | Kishi ............................ | 345/107 |
| 2004/0239613 A1 * | 12/2004 | Kishi ............................ | 345/107 |
| 2005/0174321 A1 * | 8/2005 | Ikeda et al. ................... | 345/107 |
| 2006/0125776 A1 * | 6/2006 | Togano et al. ................ | 345/107 |
| 2006/0139733 A1 * | 6/2006 | Lee et al. ...................... | 359/296 |
| 2007/0070032 A1 * | 3/2007 | Chung et al. .................. | 345/107 |

FOREIGN PATENT DOCUMENTS

| EP | 1416315 A2 | 5/2004 |
|---|---|---|
| WO | 03019279 A1 | 3/2003 |

* cited by examiner

Primary Examiner — Amare Mengistu
Assistant Examiner — Vinh Lam
(74) *Attorney, Agent, or Firm* — Larry Liberchuk

(57) ABSTRACT

The present invention relates to an electrophoretic device where a viewing electrode, which is used to attract an electrophoretic medium to a viewing area, is divided into a first (25) and a second (27) sub-electrode which are separated on the viewing area. When the electrophoretic medium is to cover the viewing area, the electrophoretic medium is first collected at one of the sub-electrodes and is then spread over the viewing area by applying a pulse between the sub-electrodes.

23 Claims, 4 Drawing Sheets

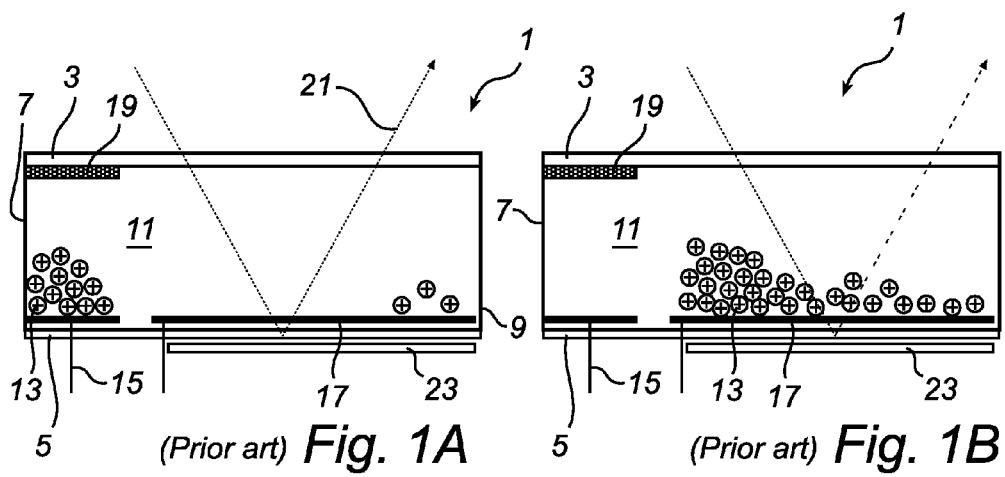
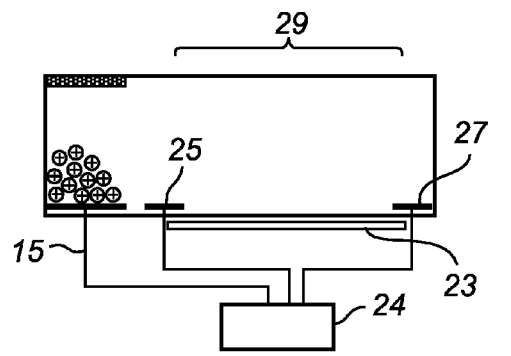
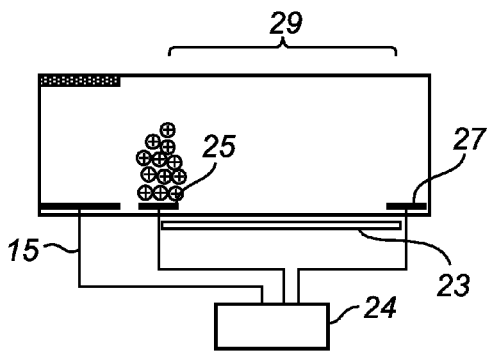
Fig. 2A                Fig. 2B
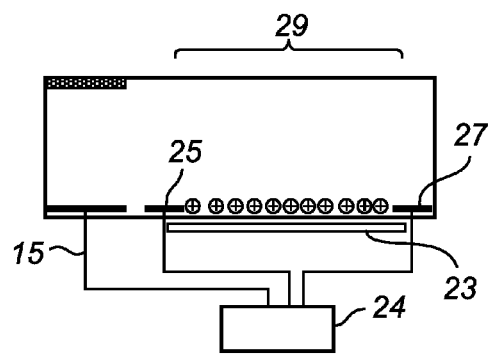
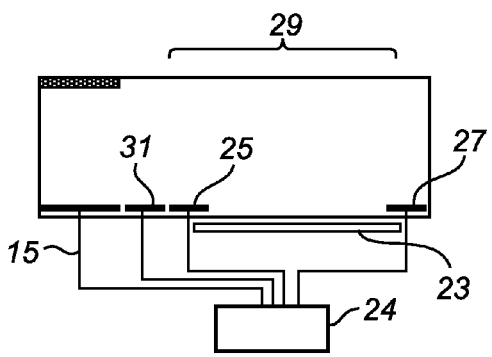
Fig. 2C                Fig. 3

ELECTROPHORETIC DEVICE AND METHOD FOR CONTROLLING THE SAME

FIELD OF THE INVENTION

The invention relates to an electrophoretic device, typically a display, comprising a drive unit and a plurality of pixel cells, arranged in an array, each cell comprising drive electrodes and an electrophoretic medium which is responsive to an electric field applied between said electrodes by the drive unit, said electrodes comprising a viewing electrode, which is situated at a viewing area of the cell, such that in a first mode, when the electrophoretic medium is attracted to the viewing electrode, the transmission of light through the cell is obstructed by the electrophoretic medium, and a collector electrode, situated outside the viewing area, such that in a second mode, when the electrophoretic medium is attracted to the collector electrode, the obstruction is reduced.

The invention further relates to a method for controlling an electrophoretic device.

BACKGROUND OF THE INVENTION

An electrophoretic device of the initially mentioned kind is described e.g. in U.S. Pat. No. 6,639,580 B1, and may be used to obtain a low-power, optionally reflective, thin display which may be capable to replace paper printouts in many applications.

One problem with the electrophoretic device of the initially mentioned kind is that the contrast may be low, i.e. the brightness difference between written and non-written cells may be low.

SUMMARY OF THE INVENTION

One object of the present invention is therefore to obtain an electrophoretic device with improved contrast.

This object is achieved by means of a device according to claim 1 and by a method according to claim 22.

More specifically, the object is achieved by a device of the initially mentioned kind wherein the viewing electrode is divided into a first and a second viewing sub-electrode, which are separated, such that there is left a free area therebetween; and the drive unit is configured to apply, when the cell is to enter the first mode, a voltage pulse between the first and second viewing sub-electrodes, such that said electrophoretic medium moves into said free area.

This configuration allows the electrophoretic medium to be very evenly spread over the free area which improves the contrast as the influence of the electrophoretic medium in the first mode is made more efficient. Additionally, the electrophoretic medium may be more efficiently removed when the free area is cleared, such that the contrast is further increased. Moreover, as the viewing sub-electrodes need not be transparent, their material may be more freely chosen.

The first and second viewing sub-electrodes may be situated at opposite edges of the viewing area.

In the cell, the collector electrode and the first and second viewing sub-electrodes may be disposed as substantially parallel strips on a first substrate of the cell and the free area and the first viewing sub-electrode may be disposed between the collector electrode and the second viewing sub-electrode. Additionally, a gate electrode may be disposed between the first viewing sub-electrode and the collector electrode. This configuration allows a general electrophoretic medium and a passive matrix drive scheme to be used.

In this configuration, the drive unit may be configured to, prior to applying the voltage pulse when the cell is to enter the first mode, a greater voltage between the collector electrode and the first viewing sub-electrode than between the gate electrode and the first viewing sub-electrode, such that the potential of the gate electrode is in between the potentials of the collector electrode and the first viewing sub-electrode.

As a first option, the drive unit may then be configured to, prior to applying the voltage pulse when the cell is to enter the first mode, provide the potential most attractive to the electrophoretic medium at the first viewing sub-electrode, such that said electrophoretic medium is collected at the first viewing sub-electrode.

Alternatively, the drive unit may be configured to, prior to applying the voltage pulse when the cell is to enter the first mode, provide the potential most attractive to the electrophoretic medium at the second viewing sub-electrode, such that the electrophoretic medium is collected at the second viewing sub-electrode.

The cell, the electrophoretic medium, and a fluid in which the electrophoretic medium is suspended may be selected such that the electrophoretic medium exhibits a threshold property. This allows a simplified addressing scheme, not using gate electrodes, to be used.

Alternatively, this may be accomplished in a cell where the electrodes are provided with a dielectric coating.

In cells not using a gate electrode, the cell, the electrophoretic medium, and the fluid in which the electrophoretic medium is suspended may be selected such that the electrophoretic medium exhibits a bi-stable property. This makes sure that the electrophoretic medium does not undergo Brownian motion to any greater extent, such that the electrodes need not be actively used, once the cell is set in the first or second mode, in order to keep the electrophoretic medium in place.

Also in cells not having gate electrodes, the collector electrode and the first and second viewing sub-electrodes may be disposed as substantially parallel strips on a first substrate of the cell.

Alternatively, the first and second viewing sub-electrodes may be disposed as substantially parallel strips on a first substrate of the cell, and the collector electrode may be provided on a second substrate of the cell, facing the first viewing sub-electrode. Additionally, a barrier may be provided between the collector electrode and the second viewing sub-electrode.

The device may also be an active matrix display, where each cell comprises a switching element. In this case, it may not be necessary to incorporate a gate electrode.

The control unit may be configured to apply a voltage between the first and second viewing sub-electrodes when the cell has entered the first mode, such that any influence on the free area from other electrodes is compensated for.

The electrophoretic medium may comprise black particles together with a substantially transparent fluid and the device may comprise a reflector, such that the first mode is a dark mode and the second mode is a bright mode.

As an alternative, the electrophoretic medium may comprise colored particles together with a substantially transparent fluid and the device may comprise a reflector, such that the first mode is a colored mode and the second mode is a bright mode. The particles may then be e.g. cyan, magenta or yellow.

As another alternative, the electrophoretic medium may comprise white particles and the device may comprise an absorber, such that the first mode is a bright mode and the second mode is a dark mode.

The amplitude of the applied pulse may decrease gradually during its duration. This reduces the timing precision requirements for the pulse.

A method for controlling an electrophoretic device of the above-described kind comprises applying, by means of the drive unit, when the cell is to enter the first mode, a voltage pulse between the first and second viewing sub-electrodes, such that said electrophoretic medium moves into said free area.

BRIEF DESCRIPTION OF THE DRAWINGS

Examples of the invention will now be described in detail with reference to the accompanying drawings, in which:

FIG. 1A-1B illustrates schematically the operation of a known electrophoretic display cell.

FIG. 2A-2C illustrate schematically the operation of an improved electrophoretic display cell.

FIG. 3 illustrates an electrophoretic cell provided with a gate electrode.

Figure 4:
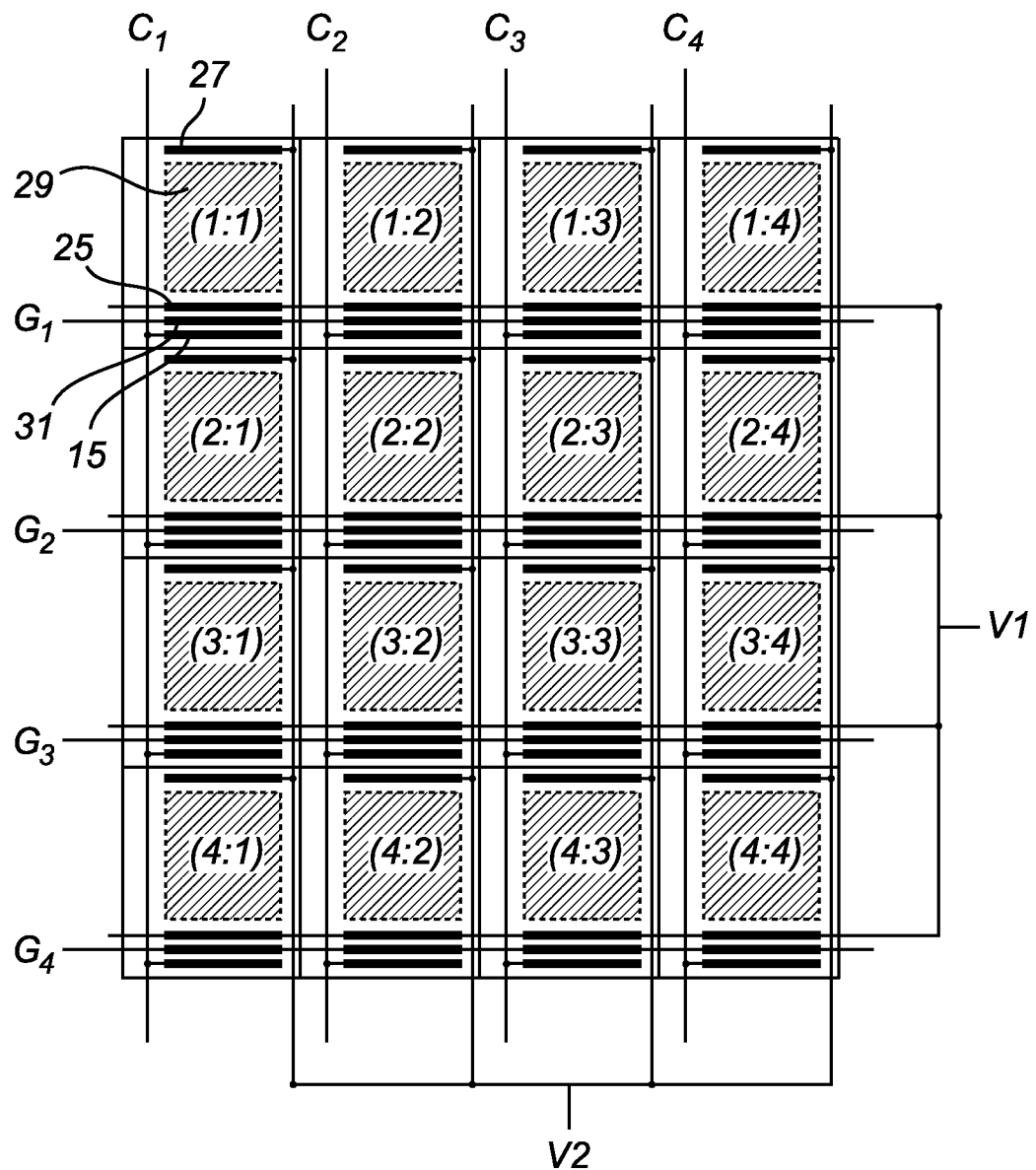
FIG. 4 illustrates an electrophoretic display comprising an array of electrophoretic cells corresponding to the cell in FIG. 3.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION OF THE EMBODIMENTS

FIGS. 1A and 1B illustrate schematically and in cross-section the operation of a known electrophoretic display cell 1. The cell is defined by a top substrate 3, a bottom substrate 5, and side walls 7, 9. A fluid 11, typically an oil, is enclosed in the cell and an electrophoretic medium 13, comprising electrically charged particles, is suspended in the fluid.

A collector electrode 15 and a viewing electrode 17 is arranged in or in connection with the cell, such that they can generate an electric field in the cell to influence the electrophoretic medium 13. In the disclosed example the particles of the electrophoretic medium are black. In FIG. 1A, the electrophoretic medium 13 is collected on top of the collector electrode 15. If the particles of the electrophoretic medium are positively charged, this may be carried out, e.g. by setting the collector electrode 15 to −150 V and the viewing electrode 17 to 0 V. The electrophoretic medium 13 may now be hidden by an optional black mask 19. The area over the viewing electrode 17 can be regarded as the viewing area, where the electrophoretic medium can influence light propagation through the cell 1. The viewing electrode 17, which is much wider than the collector electrode, may consist of ITO (Indium Tin Oxide) and may thus be more or less transparent. Thus, an incident light beam 21 may propagate through the cell and may be reflected by a reflector 23 situated beneath the cell in order to pass through the cell a second time. In FIG. 1A, the cell thus is in a bright state. Alternatively, electrodes 15 and 17 can be positioned at the top substrate 3, and reflector 23 can also be positioned inside the cell.

In FIG. 1B the known cell is instead in its dark mode. The voltages of the electrodes 15, 17 have been reversed, such that a generated electric field has forced the electrophoretic medium to be collected on top of the viewing electrode 17. Now, a great part of the incident light is absorbed while propagating through the cell 1, such that the cell appears dark. However, as can be noticed in FIG. 1B, the electrophoretic medium is not evenly distributed over the viewing area. Instead, the electrophoretic medium is to a great extent collected at the left side of the viewing electrode 17, close to the collector electrode. This effect is due to the fact that the fluid 11 in the cell is not ideal, i.e. it has some conductivity. The generated electric field will therefore be too weak at the far right end of the viewing electrode. Additionally, when the cell is to enter the bright mode, some particles of the electrophoretic medium may be left at the far right side of the viewing electrode, as illustrated in FIG. 1A. This effect will thus limit the contrast of the electrophoretic display.

FIGS. 2A-2C illustrate schematically the operation of an improved electrophoretic display cell, and at the same time an improved method for controlling an electrophoretic display. Here, the viewing electrode of the prior art has been divided into a first 25 and a second 27 viewing sub-electrode, which are situated at opposite edges of the viewing area. A free area 29 is left between the first and a second viewing sub-electrodes. The potentials of the electrodes are controlled by a control unit 24.

When the cell is intended to enter the dark mode, a voltage is first provided between the collector electrode 15 and the first viewing sub-electrode 25, such that the electrophoretic medium 13 is collected on top of the first viewing sub-electrode 25, as illustrated in FIG. 2B.

Then, a voltage pulse with limited duration is applied between the first and second viewing sub-electrodes 25, 27. This creates a very evenly distributed electrical field over the free area 29, which causes the electrophoretic medium to move into the free area, as illustrated in FIG. 2C.

The particles of the electrophoretic medium do not move like a single heap of particles, but rather unfold like a curtain or blind covering the free area. This is due to the fact that the movement of leading charged particles reduce the electric field that trailing charged particles are subjected to. Therefore leading particles will travel a longer distance in the duration of the applied pulse. The particles will thus be very evenly distributed over the free area 29. Additionally, when entering the bright state substantially all particles may easily be removed from the free area by applying a reversed voltage between the first and second viewing sub-electrodes. Moreover, since the viewing sub-electrodes do not cover the free area, they need not be transparent, such that their material may be chosen more freely while still improving the transparency of the free area and thus the display brightness. It is possible to use more than two viewing sub-electrodes, and it is possible to place a viewing sub-electrode also in the interior of the viewing area in different configurations.

FIG. 3 illustrates an electrophoretic cell provided with a gate electrode. In this cell, a gate electrode 31 is placed between the collector electrode 15 and the first viewing sub-electrode 25. This allows the use of a general electrophoretic medium, not necessarily exhibiting threshold and bi-stability properties as will be further defined hereinafter.

FIG. 4 illustrates an electrophoretic display comprising an array of electrophoretic cells corresponding to the cell in FIG. 3. To simplify the following explanation only an array with 4×4 cells, 1:1, 1:2, 1:3, etc. (row: column), are shown, even though, in a real case, hundreds of thousands cells may be used. The addressing of the cells, where it is decided whether each of the cells should be dark or bright in order to display different content, is carried out using an addressing circuitry.

In each cell the collector electrode 15 and the first and second viewing sub electrodes 25, 27 as well as the gate electrode 31 are disposed as substantially parallel strips on a first substrate of the cell.

The addressing circuitry comprises four collector lines C1, C2, C3, and C4, each connected to all collector electrodes in one column. Further, four gate lines G1, G2, G3, and G4, are provided, each connected to all gate electrodes in one row.

Figure 5:
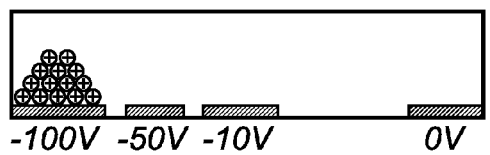
FIG. 5, FIGS. 6A-6D, and FIGS. 7A-7D illustrate the addressing scheme of the display of FIG. 4 for written and non-written cells, respectively.

The addressing of cells in the array will now be described with reference to FIG. 5, FIGS. 6A-6D, and FIGS. 7A-7D. Each of these figures illustrate a cross-section through a cell in FIG. 4 from bottom to top, such that, from left to right e.g. in FIG. 5, there is shown the collector electrode, the gate electrode, and the first and second sub-electrodes. First of all, the cells in the array may be reset, in a reset phase, as illustrated in FIG. 5. In the example, the electrophoretic medium particles are positively charged. The electrodes are set to gradually falling voltages from right to left, such that the electrophoretic medium is collected on top of the collector electrode. This may be done for all cells in parallel.

FIGS. 6A-6D illustrate the addressing process as seen in a cell being selected to be written, whereas FIGS. 7A-7D illustrate the addressing in a cell to be non-written, as decided by information sent to a driving unit, controlling the addressing circuitry.

Figure 6A:
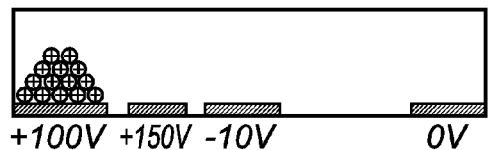
Figure 7A:
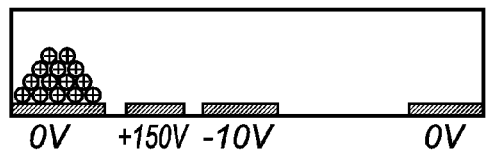

In the addressing process, the gate electrode voltages are first lowered in an addressing phase, line by line, to allow the collector electrode voltage of each cell determine whether that cell will be written or not. FIGS. 6A and 7A show the cells before addressing has taken place for their respective rows. Thus, the gate electrode voltages remain at +150 V. Therefore, regardless of whether the collector electrode is set to 0 V or 100 V (which depends on whether another cell in the same column is currently being written or not) the electrophoretic medium remains on top of the collector electrode.

Figure 6B:
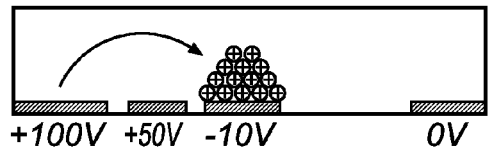
Figure 7B:
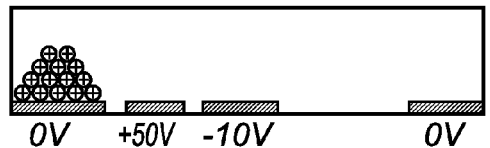
Figure 6C:
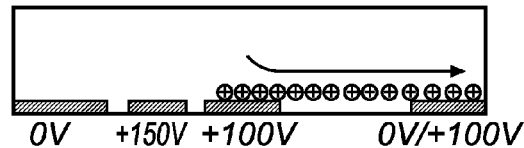
Figure 7C:
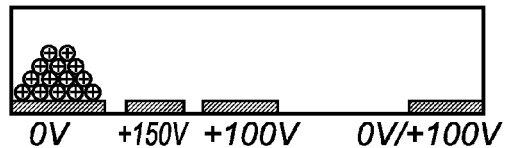
Figure 6D:
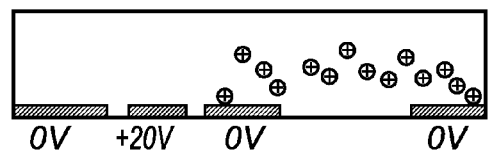
Figure 7D:
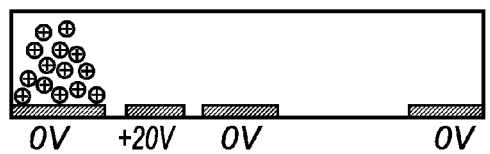

In FIGS. 6B and 7B the row of the cells is being selected by lowering the gate voltage (e.g. the voltage of line G3 in FIG. 4). In the illustrated example the voltage is lowered from +150 V to +50 V. Prior to the lowering of the gate voltage, the voltages of the collector electrodes are set depending on whether the cell is to be written or not (i.e. by setting the voltages of lines C1-C4 in FIG. 4). Thus, the collector electrode of the cell in FIG. 6B is set to 100 V, whereas the corresponding electrode of FIG. 7B is set to 0 V. All first viewing sub-electrodes of the display may at this stage be set to −10 V. Therefore the electrophoretic medium of the cell in FIG. 6B moves to the first viewing sub-electrode. In FIG. 7B, however, the electrophoretic medium cannot cross the barrier raised by the gate electrode, and this medium remains on the collector electrode. Then, the gate voltages of the two cells is again raised to +150 V before the addressing phase continues with the subsequent row. The electrophoretic media will therefore remain on the first viewing sub-electrode and the collector electrode, respectively, regardless of whether the collector voltage is 100 V or 0 V during the rest of the addressing phase. Thus, if a cell is to be written, the drive unit is configured to apply a greater voltage between the collector electrode and the first viewing sub-electrode than between the gate electrode and the first viewing sub-electrode, such that the potential of the gate electrode is in between the potentials of the collector electrode and the first viewing sub-electrode.

One way of obtaining greyscales is to limit the time during which the electrophoretic medium is allowed to pass the gate electrode, such that only a portion of the electrophoretic medium is allowed to pass. Instead, the addressing phase can be repeated. As an example, the timing of the above-described addressing condition can be tuned such that only one third of the particles are transferred each time the cell is written. The addressing phase is repeated three times. Thus, four different greyscales can be obtained depending on how many times each cell is written (including the case where no particles at all are transferred).

When all rows have been addressed a voltage pulse is applied, in a spread phase, between the first and second viewing sub-electrodes, by feeding different voltages to lines V1 and V2 in FIG. 4. Thus, the voltage of the first viewing sub-electrode may be raised from −10 V to 100 V, while the voltage at the second viewing sub-electrode may initially remain at 0 V. The electrophoretic medium of the written cell (FIG. 6C) therefore migrates into the free area of the cell. The electrophoretic medium of the non-written cell (FIG. 7C) is still locked at the collector electrode. At the end of the pulse, the voltage of the second viewing sub-electrode is raised to 100 V thereby ending the pulse. By a pulse is here generally meant that a voltage is temporarily applied between the first and second viewing sub-electrodes. The polarity and amplitude depends on the configuration.

Then, in a hold phase, the voltages of the first and second viewing sub-electrode may be lowered to 0 V. In this mode the particles are only subjected to Brownian motion, if the electrophoretic medium has Brownian motion properties, as will be discussed later. The Brownian motion of the particles may in fact be positive as it makes the particle distribution of the free area 29 even more homogenous. The gate electrode 31 is kept at a low voltage of the same polarity as the charging of the electrophoretic medium in order to keep the electrophoretic medium in place, either in the free area/viewing area (written cell, FIG. 6D) or on top of the collector electrode 15 (non-written cell, FIG. 7D). The hold phase could in principle last infinitely, and the power consumption is very low. It should be noted that the voltage of the gate electrode may to some extent influence the particles in the free area of FIG. 6D, depending e.g. on the choice of electrophoretic medium, as will be discussed later. It may therefore be advantageous to configure the control unit 24 to apply a low voltage (compared to the voltage pulse) between the first and second viewing sub-electrodes 25, 27 also in the hold phase, such that any influence on the free area from other electrodes is compensated for.

As illustrated in FIGS. 6A-6D, the lowest voltage during the addressing phase is supplied to the first viewing sub-electrode 25 (FIG. 3), such that the electrophoretic medium 13 is collected on top of this electrode before the spreading phase, if the cell is written. In this case the electrophoretic medium is positively charged, but in general terms, the potential most attractive to the electrophoretic medium is provided to the first viewing sub-electrode, i.e. if the particles were negatively charged the most positive potential would be provided to this sub-electrode.

It is however also possible to provide the most attractive potential to the second viewing sub-electrode 27, thereby collecting the electrophoretic medium at this sub-electrode during the addressing phase. This may be done simply by changing the voltage of the second viewing sub-electrode in FIGS. 6A-6D and 7A-7D to −50 V. The polarity of the applied pulse should then also be reversed in order to make the electrophoretic medium move from right to left. This approach allows the use of a thinner first viewing sub-electrode while not increasing the width of the second viewing sub-electrode as much. It is easier to collect the electrophoretic medium at the second viewing sub-electrode, as the area around this electrode experiences weaker fields at this instant. The electrophoretic medium need therefore not be stored on top of the second viewing sub-electrode. The free area can thus be increased, as can consequently the display brightness.

As mentioned, the electrophoretic display device described so far has an electrophoretic medium which comprises black particles, e.g. carbon particles, treated with a positive charging agent and being suspended in e.g. dodecane as the cell fluid 11. The display comprises a reflector, such that its first mode, when the particles are in the free area, is a dark mode, and the second mode, when the particles are on top of the collector electrode, is a bright mode. However other embodiments are possible.

Thus, the electrophoretic medium may comprise colored particles, e.g. colored in cyan (C), magenta (M) or yellow (Y). It would then be possible to obtain a color display with three layers, C, M and Y, on top of each other, possible combined with a black layer to ensure that true black can be achieved. Red-green-blue could in principle also be considered.

Additionally, the electrophoretic medium may comprise white particles, such as Titanium Oxide, and the display comprises an absorber replacing the reflector, such that the first mode is a bright mode and the second mode is a dark mode.

The person skilled in the art will understand that other options are possible. For instance, a transmissive display can be obtained by providing a backlight instead of a reflector. There also exists backlight/reflector combinations, which may adapt to any ambient light conditions. Further, electrophoretic medium particles with scattering properties rather than absorbing properties may be used, as well as particles providing different effects for different light wavelengths. Colored reflectors and absorbers may also be used. With non-absorbing particles having an index of refraction different from the fluid, it also possible to realize optical elements like reconfigurable gratings or lenses.

Moreover, it is possible to provide an electrophoretic medium which has certain properties that allows a simplified addressing circuitry or a simplified addressing scheme, compared to the one of FIGS. 5-7D. To start with, an electrophoretic medium with a bi-stable property may be used. This means that the particles are not at all or almost not at all subjected to Brownian motion (diffusion). Therefore, no voltages at all need then be applied during the hold phase.

The bi-stability may be achieved by tuning the Theological properties of the combination of the electrophoretic medium, the cell and the fluid in the cell, such that it has non-Newtonian properties. Then the combination of the electrophoretic medium and the fluid will exhibit a high viscosity for low shear stresses (as induced by diffusion) and low viscosity for high stresses (as induced by an applied electric field). This applies to so-called Bingham plastic type of liquids, which may be achieved by adding high molecular weight polymers to the liquid. It is also possible to introduce sticking forces between the particles to provide a similar effect.

Similarly, the combination of the electrophoretic medium and the fluid in the cell may be provided with properties that make the particles exhibit a threshold, meaning that the electrophoretic medium is more or less unaffected by electric fields below a threshold level. This makes it possible to remove the gate electrode of FIG. 3. Then the addressing can be modified such that the collector electrodes are interconnected row by row and the first viewing sub-electrodes are interconnected column by column, or vice versa. In such a configuration, the cells may be addressed, row by row, by raising the voltage of the collector electrodes in one row (in the case of positively charged electrophoretic medium) and lowering the voltage of the first viewing sub-electrodes of the columns to be selected in that row, such that only the selected cells will have a voltage between the collector electrode and the first viewing sub-electrode that exceeds the threshold.

Figure 8:
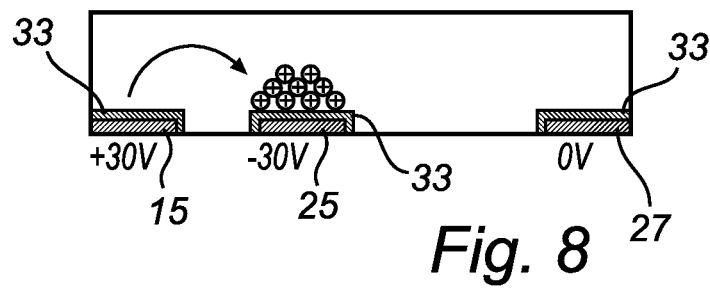
FIG. 8 illustrates an electrophoretic cell having electrodes provided with a dielectric layer.

Another way to achieve threshold properties, for a general electrophoretic medium, is to provide (at least one of) the electrodes with a dielectric coating, as illustrated in FIG. 8. In this case, the collector electrode 15 and the first and second viewing sub electrodes 25, 27 are disposed as substantially parallel strips on the bottom substrate 5 of the cell, and a dielectric coating 33 is applied on the electrodes. The dielectric coatings are tuned such that intra-electrode voltages lower than e.g. 40 V are absorbed inside the coatings. Therefore, only if a voltage greater than 40 V is applied between two electrodes will the electrophoretic medium therebetween experience a field. In the example in FIG. 8 the illustrated addressing takes place only if both the corresponding row and columns are activated, i.e. the collector voltage is raised (from 0 to +30 V) and the first viewing sub-electrode voltage is lowered (from 0 to −30 V), such that the intra-electrode voltage exceeds the 40 V threshold.

Figure 9:
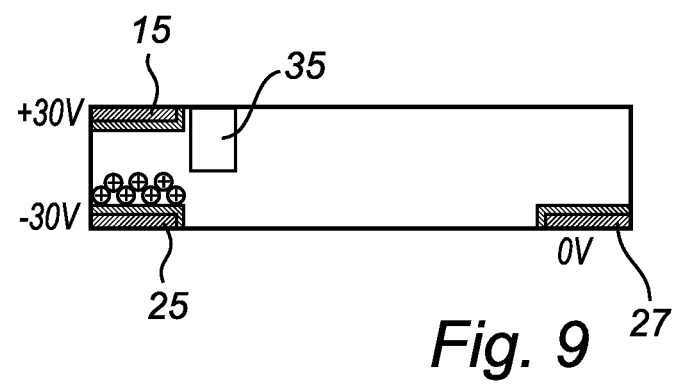
FIG. 9 illustrates an alternative configuration of an electrophoretic cell having electrodes provided with a dielectric layer.

FIG. 9 illustrates an alternative configuration where the collector electrode is provided on a second substrate of the cell, facing the first viewing sub-electrode. In this case, a barrier may be placed between the collector electrode 15 and the second viewing sub-electrode 27, such that no particle transfer can be achieved directly between these electrodes at the used voltages. This configuration increases the free/active area and consequently the brightness as compared to the configuration in FIG. 8. Additionally, the addressing circuit involves fewer crossings, since the collector electrode is disposed separately.

Figure 10:
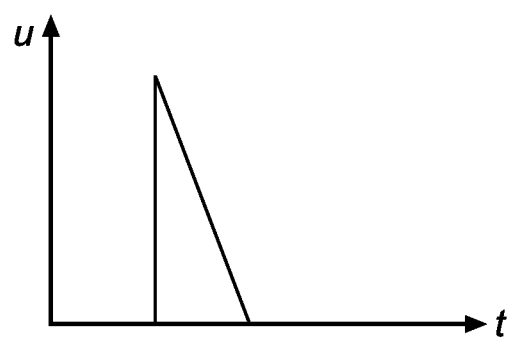
FIG. 10 illustrates a pulse form that may be used to control an electrophoretic cell.

The voltage pulse applied during the spreading phase should be timed carefully. If the pulse is too short, the electrophoretic medium will only move into the free area to some extent, thus making the pixel appear grey. If the pulse is too long on the other hand, the trailing particles will move to far into the free area, leading to the same effect. The optimum pulse duration should be tested for the used combination of electrophoretic medium, fluid and used voltages. One way to make the pulse duration tolerance less strict is to use a pulse form schematically illustrated in FIG. 10. In this case, the pulse commences at an initial voltage and then decreases gradually during its duration. In the illustrated case the pulse decreases linearly. However the pulse may decrease in other ways; exponentially, logarithmically, step-wise, etc. while still obtaining a similar effect.

While in the above described embodiments the display is a passive matrix display, the display device may be devised as an active matrix display, were each cell comprises a switching element, as is realized by the skilled person.

In summary, the present invention relates to an electrophoretic display where a viewing electrode, which is used to attract an electrophoretic medium to a viewing area, is divided into a first and a second sub-electrode which are separated on the viewing area. When the electrophoretic medium is to cover the viewing area the electrophoretic medium is first collected at one of the sub-electrodes and is then spread over the viewing area by applying a pulse between the sub-electrodes.

The described display device may be used e.g. as electronic paper and in electronic price tags, electronic shelf labels, and electronic billboards.

The invention is not restricted to the described embodiments, but may be varied within the scope of the appended claims.

For instance, even though the electrophoretic medium used in the drawings is positively charged, negatively charged particles may instead be used in the electrophoretic medium. The electrode voltages are then reversed. Needless to say, the used voltage amplitudes in the above description are only examples.

While the invention has been illustrated and described in detail in the drawings and foregoing description, such illustration and description are to be considered illustrative or exemplary and not restrictive; the inventions is not limited to the disclosed embodiments. Variations to the disclosed embodiments can be understood and effected by those skilled in the art in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An electrophoretic device comprising a drive unit and a plurality of pixel cells, arranged in an array, each cell comprising drive electrodes and an electrophoretic medium which is responsive to an electric field applied between said electrodes by the drive unit, said electrodes comprising a viewing electrode, which is situated at a viewing area of the cell, such that in a first mode, when the electrophoretic medium is attracted to the viewing electrode, the transmission of light through the cell is obstructed by the electrophoretic medium, and a collector electrode, situated outside the viewing area, such that in a second mode, when the electrophoretic medium is attracted to the collector electrode, the obstruction is reduced, wherein the viewing electrode is divided into at least a first and a second viewing sub-electrode, wherein the first and second viewing sub-electrodes are disposed both on the same surface of the pixel cell in a substantially co-planar arrangement and toward opposite lateral edges of the cell such that a free area in said viewing area is formed by a lateral separation between adjacent edges of the first and second viewing sub-electrodes, wherein the free area is free of any viewing electrode and viewing sub-electrode; and the drive unit is configured to apply, when the cell is to enter the first mode, a voltage pulse between the first and second viewing sub-electrodes, such that said electrophoretic medium moves into said free area.

2. The electrophoretic device, according to claim 1, wherein the first and second viewing sub-electrodes are situated at opposite edges of the viewing area.

3. The electrophoretic device according to claim 2, wherein in the cell the collector electrode and the first and second viewing sub-electrodes are disposed as substantially parallel strips on a first substrate of the cell.

4. The electrophoretic device according to claim 3, wherein the free area and the first viewing sub-electrode are disposed between the collector electrode and the second viewing sub-electrode.

5. The electrophoretic device according to claim 4, wherein a gate electrode is disposed between the first viewing sub-electrode and the collector electrode.

6. The electrophoretic device according to claim 5, wherein the drive unit is configured to provide, prior to applying said voltage pulse when the cell is to enter the first mode, a greater voltage between the collector electrode and die first viewing sub-electrode than between the gate electrode and the first viewing sub-electrode, such that a potential of the gate electrode is in between the potentials of the collector electrode and the first viewing sub-electrode.

7. the electrophoretic device according to claim 4, wherein die drive unit is configured to, prior to applying said voltage pulse when the cell is to enter the first mode, providing a potential most attractive to said electrophoretic medium at the first viewing sub-electrode, such that said electrophoretic medium is collected at the first viewing sub-electrode.

8. The electrophoretic device according to claim 4, wherein, the drive unit is configured to, prior to applying said voltage pulse when the cell is to enter the first mode, providing a potential most attractive to said electrophoretic medium at the second viewing sub-electrode, such that said electrophoretic medium is collected at the second viewing sub-electrode.

9. The electrophoretic device according to claim 1, wherein the cell, the electrophoretic medium, and a fluid in which the electrophoretic medium is suspended are selected such that the electrophoretic medium exhibits a threshold property.

10. The electrophoretic device according to claim 1, wherein at least one of the electrodes is provided with a dielectric coating.

11. The electrophoretic device according to claim 1, wherein the cell, the electrophoretic medium, and a fluid in which the electrophoretic medium is suspended are selected such that the electrophoretic medium exhibits a bi-stable property.

12. The electrophoretic device according to claim 9, wherein the collector electrode and the first and second viewing sub-electrodes are disposed as substantially parallel strips on a first substrate of the cell.

13. The electrophoretic device according to claim 9, wherein the first and second viewing sub-electrodes are disposed as substantially parallel strips on a first substrate of the cell, and the collector electrode is provided on a second substrate of the cell, facing the first viewing sub-electrode.

14. The electrophoretic device according to claim 13, wherein a barrier is provided between the collector electrode and the second viewing sub-electrode.

15. The electrophoretic device according to claim 1, wherein the device is an active matrix display, each cell comprising a switching element.

16. The electrophoretic device according to claim 1, wherein the control unit is configured to apply a voltage between the first and second viewing sub-electrodes when the cell has entered the first mode, such that any influence on the free area from other electrodes is compensated for.

17. The electrophoretic device according to claim 1, wherein the electrophoretic medium comprises black particles and the device comprises a reflector, such that the first mode is a dark mode and the second mode is a bright mode.

18. The electrophoretic device according to claim 1, wherein the electrophoretic medium comprises colored particles and the device comprises a reflector, such that the first mode is a colored mode and the second mode is a bright mode.

19. The electrophoretic device according to claim 18, wherein the particles are cyan, magenta or yellow.

20. The electrophoretic device according to claim 1, wherein the electrophoretic medium comprises white particles and the device comprises an absorber, such that the first mode is a bright mode and the second mode is a dark mode.

21. The electrophoretic device according to claim 1, wherein the amplitude of said pulse decreases gradually during its duration.

22. A method for controlling an electrophoretic device comprising a drive unit and a plurality of pixel cells, arranged in an array, each cell comprising drive electrodes and an electrophoretic medium which is responsive to an electric field applied between said electrodes by the drive unit, said electrodes comprising a viewing electrode, which is situated at a viewing area of the cell, such that in a first mode, when the electrophoretic medium is attracted to the viewing electrode, the transmission of light through the cell is obstructed by the electrophoretic medium, and a collector electrode, situated outside the viewing area, such that in a second mode, when the electrophoretic medium is attracted to the collector electrode, the obstruction is reduced, wherein the viewing electrode is divided into a first and a second viewing sub-electrode, wherein the first and second viewing sub-electrodes are disposed both on the same surface of the pixel cell in a substantially co-planar arrangement and toward opposite lateral edges of the cell such that a free area in said viewing area is formed by a lateral separation between adjacent edges of the first and second viewing sub-electrodes, wherein the free area is free of any viewing electrode and viewing sub-electrode; and the method comprises applying, by means of the drive unit, when the cell is to enter the first mode, a voltage pulse between the first and second viewing sub-electrodes, such that said electrophoretic medium moves into said free area.

23. An electrophoretic device comprising a drive unit and a plurality of pixel cells, arranged in an array, each cell comprising drive electrodes and an electrophoretic medium which is responsive to an electric field applied between said electrodes by the drive unit, said electrodes comprising a viewing electrode, which is situated at a viewing area of the cell, such that in a first mode, when the electrophoretic medium is attracted to the viewing electrode, the transmission of light through the cell is obstructed by the electrophoretic medium, and a collector electrode, situated outside the viewing area, such that in a second mode, when the electrophoretic medium is attracted to the collector electrode, the obstruction is reduced, wherein the viewing electrode is divided into at least a first and a second viewing sub-electrode, wherein the first and second viewing sub-electrodes are disposed toward opposite lateral edges of the cell such that a free area in said viewing area is formed by a lateral separation between adjacent edges of the first and second viewing sub-electrodes, wherein the free area is free of any viewing electrode and viewing sub-electrode and is substantially transverse to a normal viewing direction for the electrophoretic device; and the drive unit is configured to apply, when the cell is to enter the first mode, a voltage pulse between the first and second viewing sub-electrodes, such that said electrophoretic medium moves into said free area.

* * * * *